United States Patent [19]

Metzger et al.

[11] Patent Number: 4,520,001

[45] Date of Patent: May 28, 1985

[54] PROCESS FOR PRODUCING SOLUTIONS OF ALKALI METAL SILICATE IN A STATIC REACTOR

[76] Inventors: Jean Metzger, 16, allee Gay Lussac, Pierre Benite, France, 69310; Henri Lecouls, 7, avenue Beauregard, St. Genis Laval, France, 69230; Philippe Colombé, chemin des Vallons des Mourgues, Le Peyblanc, Aix en Provence, France, 13090; Jean Wojcik, 42, Chemin de la Tassine, St. Genis Laval, France, 69230

[21] Appl. No.: 482,465

[22] Filed: Apr. 6, 1983

[30] Foreign Application Priority Data

Apr. 16, 1982 [FR] France ............................. 82 06563

[51] Int. Cl.$^3$ ............................................. C01B 33/32
[52] U.S. Cl. .................................................... 423/332
[58] Field of Search ................................. 423/326, 332

[56] References Cited

U.S. PATENT DOCUMENTS 2,251,515  8/1941  Curll ..................................... 423/332
4,336,235  1/1982  Deabriges ............................ 423/332

FOREIGN PATENT DOCUMENTS 33108    3/1983  European Pat. Off. .
33109    4/1983  European Pat. Off. .
3002834  7/1981  Fed. Rep. of Germany ...... 423/332
788933   1/1958  United Kingdom .

OTHER PUBLICATIONS

Frederick C. Price, "New: Liquid-Process Sodium Silicate", Chemical Engineering, Feb. 5, 1962, pp. 76-78.
Vail, J. G., *Soluble Silicates*, vol. 1, p. 6, Reinhold Pub. Corp., (1952).
John C. Olsen, *Unit Processes and Principles of Chemical Engineering*, (D. Van Nostrand, Inc., New York, 1932), pp. 1-3.
Joseph A. Babor, *Basic College Chemistry*, (Thomas Y. Crowell Company, New York, 1953, second edition), p. 256.

*Primary Examiner*—Gary P. Straub
*Assistant Examiner*—Jackson Leeds
*Attorney, Agent, or Firm*—Pennie and Edmonds

[57] ABSTRACT

The process for producing a clear solution of alkali metal silicate having an $SiO_2$/alkali metal oxide weight ratio of 2.5 or less which comprises passing an aqueous solution of an alkali metal hydroxide through a bed of crystallized silica having an average particle size of between about 0.1 mm and 2 mm formed in the bottom of a vertical tubular reactor without mechanical agitation, said silica and alkali metal hydroxide being fed from the top of the reactor, and recovering the resulting clear solution of alkali metal silicate from the bottom of the reactor.

14 Claims, 1 Drawing Figure

U.S. Patent   May 28, 1985   4,520,001
PROCESS FLOW SHEET
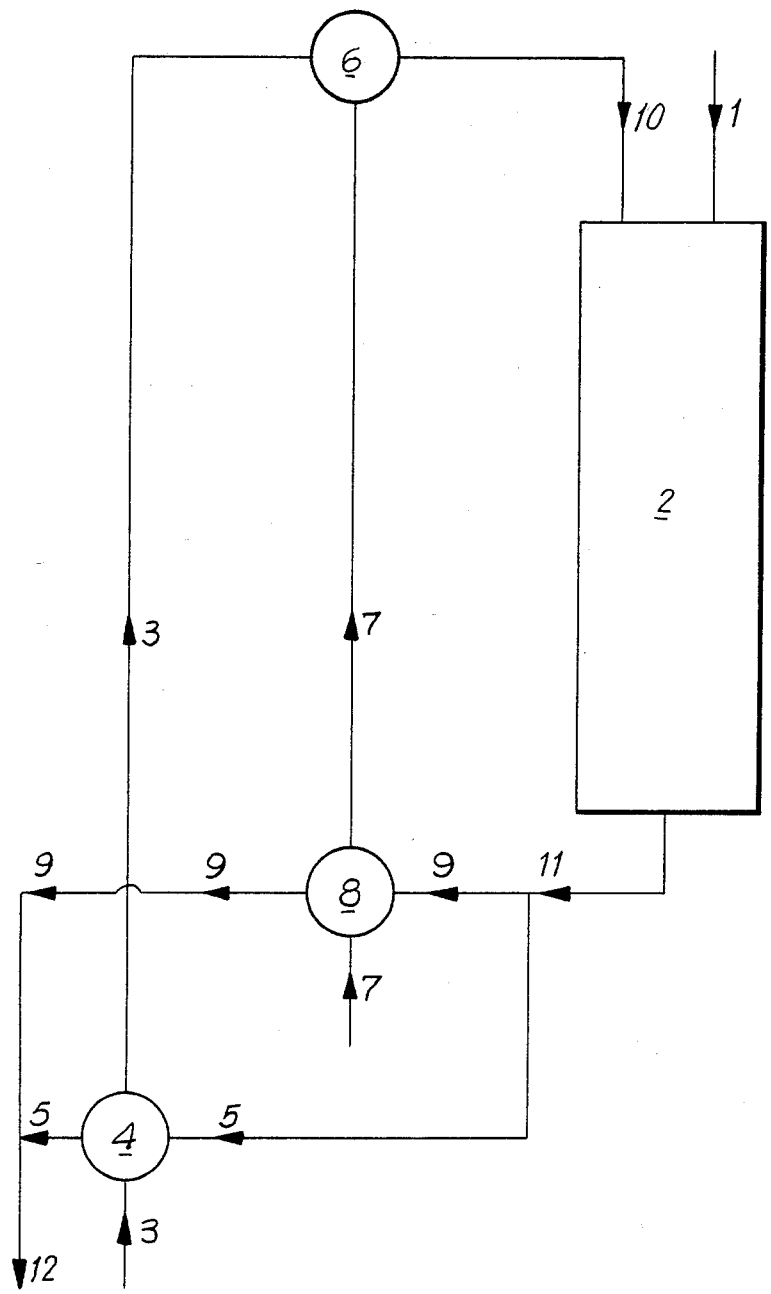

4,520,001

PROCESS FOR PRODUCING SOLUTIONS OF ALKALI METAL SILICATE IN A STATIC REACTOR

TECHNICAL FIELD

The present invention concerns a process for producing solutions of alkali metal silicate by reacting silica with an alkaline solution.

BACKGROUND OF THE INVENTION

The process for producing alkali metal silicates by alkaline fusion of silica is well known, in particular from "Soluble Silicates" by J. G. Vail, Reinhold Pub. Corp., Vol. 1, p. 6 (1952). This process is still virtually the only process used today for producing alkali metal silicates.

Another well known process is the autoclaving of silica with an alkaline solution. Thus "Gmelins Handbuch der anorganischen Chemie," Vol. 21 (1928), p. 861, discloses work of Liebig (1857) and other authors along these lines, but these processes only produce silicates that are too rich in sodium hydroxide for industrial use.

Patents such as British Pat. No. 788,933 show the advantage of a process working at a temperature between 175° C. and 320° C., whereas alkaline fusion requires temperatures near or exceeding 1,300° C.

U.S. Pat. No. 3,971,727 describes the production of alkali metal silicates in aqueous solution under pressure at a temperature of between 138° C. and 210° C., but is necessary to agitate mechanically and to filter the product. The process involves fairly long reaction times, the presence of by-products in the reaction product, and is thus not a commercially feasible process.

European Pat. Nos. 33,108 and 33,109 also disclose processes for the production of sodium silicates, but these processes also require agitation and filtration of the suspension.

A process for reacting silica with an alkaline solution to produce alkali metal silicates which can save energy is of considerable value. In order to produce alkali metal silicates economically and save energy, the process must produce solutions of silicates sufficiently rich in $SiO_2$ which can be directly used commercially. For example, in the production of sodium aluminosilicates (type A zeolites) and for the detergent industry, sodium silicate having an $SiO_2/Na_2O$ weight ratio near or greater than 2 and, at most, equal to 2.5, is required.

DESCRIPTION OF THE INVENTION

The process of the invention comprises feeding crystallized silica of an average particle size between about 0.1 mm and 2 mm and an aqueous solution of alkali metal hydroxide, such as sodium hydroxide, into a vertical tube reactor. Control of the temperature and rate of feed of the reagents, as well as of the concentration of the alkaline solution, ensures production of the product in the concentration and in the $SiO_2/Me_2O$ weight ratio desired.

The applicants' process not only meets the above conditions but in addition permits:

the use of quartz sands of larger particle size rather than of silica flour, resulting in a saving of grinding energy, the absence of agitation of the sand-solution mixture while at the same time ensuring a good transfer of reactive mass-sand-reaction product, obtaining the solutions in an apparatus especially designed for this purpose and without the necessity of filtration, and the production of alkali metal silicates of the desired elevated $SiO_2/Me_2O$ ratio.

The process of this invention results in a considerable simplification of the installation, along with great flexibility of use, and hence, an appreciable reduction in investment costs.

The silica used is a quartz sand the particle size of which may not be less than about 0.1 mm, because of the pressure loss of the system. The silica should not have a particle size greater than about 2 mm, so that the speed of the reaction will not be significantly reduced. An intermediate particle size such as 0.3 mm to 0.8 mm is preferred.

Although the same reaction may take place in the presence of alkaline solutions other than aqueous solutions of sodium hydroxide, sodium hydroxide solutions are preferred industrially. These last alkaline solutions should have a metal oxide ($Na_2O$) concentration of between 8.9 and 28.6% at the onset of the reaction with the silica. In effect, too great a dilution leads to solutions of sodium silicate which would not be directly utilizable for industrial purposes, and too strong a metal oxide ($Na_2O$) concentration produces plugging in the bed of sand through formation of crystals of sodium disilicate.

The reactor is fed at the top, and the reaction takes place within the bed of sand which simultaneously serves as source of silica and as a filter. This ensures a good transfer of material and the production of a clear solution of alkali metal silicate.

The inner part of the reactor, in contact with hot alkaline solutions, is made of a corrosion-resistant metal or alloy. Nickel is very suitable for this purpose but ordinary steels, such as those used for boilers, may likewise be used, especially if the alkaline solution is treated with carbonate as recommended by French Pat. No. 2,462,390. The reactor is equipped with a metal grate or wire gauze in its lower part in order to retain the sand, or with any other device suitable to support the sand and create a minimal pressure drop. This section of the reactor (the grate) determines the rate of passage of the solution through the silica. This rate should be between about 2 and 15 m/hr. Too low a rate permits neither sufficient productivity nor a proper transfer, and too high a rate leads to a pressure drop such that control of the reaction is not possible. The sand in the reactor likewise plays the role of a filter, with a minimum level of sand and leads to perfectly clear solutions.

The $SiO_2/Na_2O$ weight ratio and the rate of reaction are functions of the temperature in the reactor bed. The reaction bed temperature should be between about 150° and 240° C. in order to permit sufficient reaction of the silica and control of the reaction. As the reaction is slightly exothermic, it is needless to heat the reactor. On the other hand, the alkaline solution should be introduced at a temperature such that the temperature in the reactor is maintained at the desired temperature. The temperature of the alkali metal silicate products is sufficient to ensure concentration of the solution, and/or for preheating of the reagents.

A preferred embodiment of the process pursuant to the invention consists of forming the aqueous solution of alkali metal hydroxide entering the reactor in such a way that no outside supply of heat energy is necessary. This can be advantageously accomplished by using the calories or heat available in the alkali metal silicate solutions leaving the reactor for separately preheating a concentrated aqueous solution of the alkali metal hydroxide and the water used to form the alkali metal hydroxide solution. The calories or heat furnished by the exothermic dilution of the concentrated alkali metal hydroxide by the water for forming the alkaline solution entering the reactor are also used for preheating the alkaline feed solution.

It is possible to obtain clear solutions of sodium silicate containing 35% by weight to 46% by weight of sodium silicate with no outside supply of heat energy.

The particularly advantageous result of the process of the invention in its preferred embodiment lies not only in the savings of heat energy realized by the mode of operation within the framework of the invention, but also in the fact that clear solutions of alkali metal silicates can be economically obtained which are directly usable in industry.

FIG. 1 is a schematic illustration of the equipment and the process corresponding to the preferred embodiment of the invention.

Silica, for example a quartz sand, drawn from storage containers is continuously fed through the duct 1 into the top of the reactor 2 at a pressure greater than atmospheric pressure. The bed of sand that forms in the bottom of this reactor is supported by any device, not shown in the drawing, suitable for supporting the sand and presenting a minimal pressure drop, such as a grate or wire gauze screen. The grate or wire gauze should be of sufficient mesh size to support the bed of sand of the particle size being employed but, of course, capable of permitting the metal silicate solution formed to flow through for collection.

A concentrated aqueous solution of an alkali metal hydroxide, carried by the line 3, is preheated at 4 by indirect heat exchange with the alkaline silicate solution circulating in the line 5.

The alkali metal hydroxide is then diluted homogeneously at 6 by water carried by line 7 and the water is itself preheated at 8 by indirect heat exchange with the alkali metal silicate solution circulating in the line 9.

The alkaline solution thus obtained enters the top of the reactor 2, above the bed of silica, through the line 10.

The solution of alkali metal silicate which comes out continuously at the bottom of the reactor 2 through the line 11 is first divided in the lines 5 and 9, and becomes a single stream again in the line 12 after being used for preheating of the concentrated alkaline solution at 4 and of the water at 8. The final solution is evacuated, for collection, through line 12.

The following examples, given as non-limitative, illustrate the process of the invention. Examples 9 and 10 illustrate, in particular, the preferred embodiment of the invention.

EXAMPLE 1

A charge of 53 kg of quartz sand of 300 micron average particle size is introduced into a vertical nickel tube, heat-insulated and having an inside diameter of 90 mm and a length of 6 m to form a bed at the bottom of the reactor on a porous support. An aqueous solution of sodium hydroxide containing 19.6% by weight of $Na_2O$ is passed through the sand bed for 1 hr 20 min at a rate of 50 l/hr. The temperature of the reaction is maintained at 225° C. A solution of sodium silicate containing 194 g/l of $Na_2O$ and 485 g/l of $SiO_2$ is collected from the bottom of the reactor. The sand which has not reacted remains in the reactor, which is recharged with fresh sand for the next reaction.

EXAMPLE 2

A vertical nickel tube, heat-insulated, having an inside diameter of 90 mm and a length of 2 m, and a suitable porous sand supporting grate at the bottom, is continuously fed from the top with a quartz sand of 300$\mu$ average particle size at the rate of 22 kg/hr and a hot aqueous solution of sodium hydroxide containing 11.2% by weight of $Na_2O$ at the rate of 69 l/hr. The temperature of the reaction is maintained at 220° C. The silicate solution formed at the bottom of the reactor contains 125 g/l of $Na_2O$ and 306 g/l of $SiO_2$.

EXAMPLE 3

27 kg/hr of silica are continuously introduced into the top of the reaction tube of Example 2 together with an aqueous solution of sodium hydroxide containing 17.6% by weight of $Na_2O$ at the rate of 50 l/hr. The silica is a quartz sand of 850$\mu$ average particle size. The temperature of the reaction is maintained at 218° C. The silicate solution formed at the bottom of the reactor contains 175 g/l of $Na_2O$ and 429 g/l of $SiO_2$.

EXAMPLE 4

8.4 kg/hr of silica are continuously introduced at the top of the reactor of Example 2 together with an aqueous sodium hydroxide solution containing 19.6% by weight of $Na_2O$ at the rate of 33 l/hr. The silica is a quartz sand of 300$\mu$ average particle size. The temperature in the reactor is maintained at 160° C. The silicate solution formed at the bottom of the reactor contains 197 g/l of $Na_2O$ and 200 g/l of $SiO_2$.

EXAMPLE 5

25 kg/hr of silica are continuously introduced into the reactor of Example 2 from the top together with an aqueous sodium hydroxide solution containing 23.4% by weight of $Na_2O$ at the rate of 40 l/hr. The silica is a quartz sand of 300$\mu$ average particle size. The temperature in the reactor is 190° C. The silicate solution formed at the bottom of the reactor contains 226 g/l of $Na_2O$ and 454 g/l of $SiO_2$.

EXAMPLE 6

Silica, at the rate of 23 kg/hr and a solution containing 14.9% by weight of $Na_2O$ and 20 g/l of $Na_2CO_3$ at the rate of 50 l/hr of solution are continuously fed into a steel vertical tube reactor, equipped with a double jacket and having an inside diameter of 90 mm and a length of 2 m and suitable sand supporting porous grate at the bottom thereof. The silica is a quartz sand of 300$\mu$ average particle size. The temperature of the reaction is maintained at 218° C. The silicate solution formed at the bottom of the reactor contains 160 g/l of $Na_2O$ and 384 g/l of $SiO_2$.

EXAMPLE 7

21 kg/hr of silica and an aqueous sodium hydroxide solution containing 16.7% by weight of $Na_2O$ at the rate of 50 l/hr are continuously fed into the top of the reaction tube of Example 2. The silica is a quartz sand of 130$\mu$ average particle size. The temperature of reaction is maintained at 190° C. The silicate solution formed contains 165 g/l of $Na_2O$ and 338 g/l of $SiO_2$.

EXAMPLE 8

31 kg/hr of silica and an aqueous solution of potassium hydroxide containing 26.7% by weight of $K_2O$ at the rate of 50 l/hr are continuously fed into the top of the reaction tube of Example 2. The silica is a quartz sand of 300μ average particle size. The temperature of the reaction is maintained at 195° C. The silicate solution formed at the bottom of the reactor contains 264 g/l of $K_2O$ and 462 g/l of $SiO_2$.

EXAMPLE 9

13.3 kg/hr of quartz sand having an average particle size equal to 300μ are introduced at ambient temperature into the top of a reactor made of a vertical cylindrical tube of ordinary steel, having an inside diameter equal to 90 mm and a height equal to 6 m, and having a porous grate at the bottom suitable to support the sand and permit flow of the metal silicate product therethrough. The entire installation is carefully heat insulated.

Into the top of the same reactor, and above the bed of sand, 33.6 kg/hr of a concentrated aqueous solution of sodium hydroxide containing 19.8% by weight of $Na_2O$ are introduced. The temperature of the hydroxide solution is 192° C.

This alkaline solution at 192° C. is obtained by the homogeneous and exothermic mixing of 17.9 kg of a concentrated aqueous solution of sodium hydroxide, containing 37.2% by weight of $Na_2O$ previously brought to 171° C. by indirect heat exchange with the sodium silicate solution leaving the reactor at 188° C., with 15.7 kg/hr of water also previously brought to a temperature 171° C. by a heat exchange with the same sodium silicate solution leaving the reactor at 188° C. The exothermic heat developed by the mixing of the preheated concentrated sodium hydroxide solution and the prehead water brings the temperature of the dilute sodium hydroxide feed solution to its feed temperature of 192° C.

The clear sodium silicate solution, produced at the rate of 46.9 kg/hr, contains 42.6% by weight of sodium silicate in which the $SiO_2/Na_2O$ weight ratio is equal to 2.

EXAMPLE 10

Example 9 is repeated except that the sand is fed at the rate of 25.5 kg/hr and the sodium hydroxide solution containing 21.4% by weight of $Na_2O$ is fed at the rate of 59.5 kg/hr. The temperature of the sodium hydroxide solution is 213° C.

This alkaline solution at the temperature of 213° C. is obtained by the homogeneous and exothermic mixing of 34.27 kg/hr of a concentrated aqueous solution of sodium hydroxide, containing 37.2% by weight of $Na_2O$ previously brought to a temperature of 192° C. by indirect heat exchange with the sodium silicate solution coming from the reactor at the temperature of 207° C. with 25.23 kg/hr of water also previously brought to the temperature of 192° C. by the same heat exchange as defined above. The exothermic heat developed by mixing the concentrated sodium hydroxide solution and water brings the diluted sodium hydroxide solution to its feed temperature of 213° C.

The clear sodium silicate solution, produced at the rate of 85 kg/hr, contains 45% by weight of sodium silicate in which the $SiO_2/Na_2O$ weight ratio is equal to 2.

The silica in the above examples was introduced into the reactor at the pressure of about 30 atmospheres and the grate support designed to provide a pressure drop of less than 0 atmosphere.

We claim:

1. A process for producing a clear alkali metal silicate solution having an $SiO_2$/alkali metal oxide weight ratio of 2.5 or less which comprises:
    (a) establishing a bed of crystallized silica in a tubular reactor, said silica having an average particle size of between about 0.1 and 2 mm;
    (b) introducing an aqueous solution of an alkali metal hydroxide at the top of the reactor to react with a portion of said silica bed at a temperature between about 150° and 240° C. and at a pressure greater than the saturated vapor pressure of the liquid phase of the system at the reaction temperature, said alkali metal hydroxide solution traversing said silica bed at a rate between about 2 and 15 m/hr;
    (c) introducing fresh silica at the top of the reactor in an amount to substantially replenish the portion of the silica bed which has reacted with the alkali metal hydroxide, the remaining unreacted part of said bed being sufficient to filter impurities from said silicate solution; and
    (d) recovering the resulting clear alkali metal silicate solution from the bottom of the reactor.

2. The process according to claim 1 wherein said crystallized silica is quartz or silica sand.

3. The process according to claim 2, in which the aqueous solution of the alkali metal hydroxide entering the reactor is an aqueous solution of sodium hydroxide containing about 8.9% by weight to about 28.6% by weight of $Na_2O$.

4. The process according to claim 3 wherein said silica particle size is between about 0.3 mm and 0.8 mm.

5. The process according to claim 4 wherein said $SiO_2/Na_2O$ weight ratio is between about 2.0 and 2.5.

6. A process for producing a clear sodium silicate solution having an $SiO_2/Na_2O$ weight ratio of 2.5 or less which comprises:
    (a) establishing a bed of crystallized silica in a tubular reactor, said silica having an average particle size of between about 0.1 and 2 mm;
    (b) introducing an aqueous solution of sodium hydroxide at the top of the reactor to react with said silica bed at a temperature between about 150° and 240° C. and at a pressure greater than the saturated vapor pressure of the liquid phase of the system at the reaction temperature, said sodium hydroxide solution traversing said silica bed at a rate between about 2 and 15 m/hr;
    (c) introducing fresh silica at the top of the reactor in an amount to substantially replenish the portion of the silica bed which has reacted with the sodium hydroxide solution, the remaining unreacted part of said bed being sufficient to filter impurities from said sodium silicate solution; and
    (d) recovering the resulting clear sodium silicate solution from the bottom of the reactor.

7. The process according to claim 6 wherein said crystallized silica is quartz or silica sand.

8. The process according to claim 7 wherein said silica particle size is between about 0.3 mm and 0.8 mm.

9. The process according to claim 8 wherein said $SiO_2/Na_2O$ weight ratio is between about 2.0 and 2.5.

10. A process for producing a clear alkali metal silicate solution having an $SiO_2$/alkali metal oxide weight ratio of between about 2 and 2.5 which comprises:
   (a) establishing a bed of crystallized silica in a tubular reactor, said silica having an average particle size of between about 0.3 and 0.8 mm;
   (b) introducing an aqueous solution of an alkali metal hydroxide at the top of the reactor;
   (c) introducing at the top of the reactor an amount of fresh silica which is substantially stoichiometric to the introduced hydroxide solution;
   (d) reacting said alkali metal hydroxide and the introduced or bed of silica at a temperature between about 150° and 240° C. and at a pressure greater than the saturated vapor pressure of the liquid phase of the system at the reaction temperatures, said alkali metal hydroxide solution traversing the bed at a rate of between about 2 and 15 m/hr, and said introduced stoichiometric amount of fresh silica being sufficient to replenish that which has reacted with said alkali metal hydroxide so as to maintain the bed of silica, with the remaining, unreacted part of said silica bed being sufficient to filter impurities from said alkali metal silicate soution; and
   (e) recovering the resulting clear alkali metal silicate solution from the bottom of said reactor.

11. The process according to claim 10 wherein said crystallized silica is quartz or silica sand.

12. A process for producing a clear sodium silicate solution having an $SiO_2/Na_2O$ weight ratio of between about 2 and 2.5 which comprises:
   (a) establishing a bed of crystallized silica in a tubular reactor, said silica having an average particle size of between about 0.3 and 0.8 mm;
   (b) introducing an aqueous solution of sodium hydroxide containing between about 8.9 and 28.6 percent by weight of $Na_2O$ at the top of the reactor;
   (c) introducing at the top of the reactor an amount of fresh silica which is substantially stoichiometric to the introduced hydroxide solution;
   (d) reacting said sodium hydroxide and the introduced or bed of silica at a temperature between about 150° and 240° C. and at a pressure greater than the saturated vapor pressure of the liquid phase of the system at the reaction temperatures, said sodium hydroxide solution traversing the bed at a rate of between about 2 and 15 m/hr, said introduced stochiometric amount of fresh silica being sufficient to replenish that which has reacted with said sodium hydroxide solution so as to maintain the bed of silica, with the remaining, unreacted part of said silica bed being sufficient to filter impurities from said sodium silicate solution; and
   (e) recovering the resulting clear sodium silicate solution from the bottom of said reactor.

13. The process according to claim 12 wherein said crystallized silica is quartz or silica sand.

14. The process according to claim 13, wherein the clear sodium silicate solution produced contains silicon and sodium in a $SiO_2/Na_2O$ weight ratio equal to about 2.

* * * * *